UNITED STATES PATENT OFFICE.

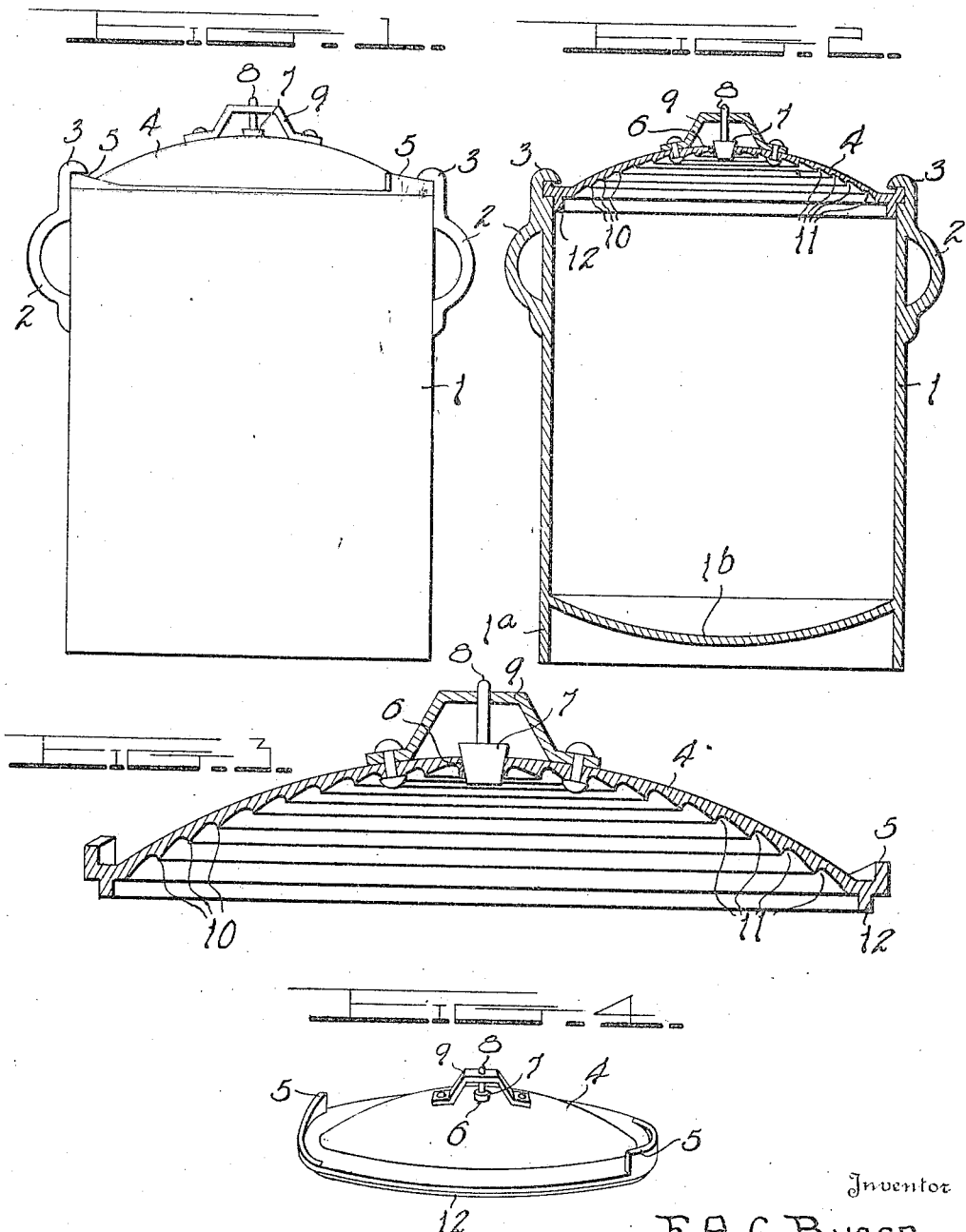

FELIX A. G. BUSSE, OF HAPPY CAMP, CALIFORNIA.

SANITARY STEAM-COOKER.

1,249,023.   Specification of Letters Patent.   Patented Dec. 4, 1917.

Application filed July 23, 1915. Serial No. 41,471.

*To all whom it may concern:*

Be it known that I, FELIX A. G. BUSSE, a citizen of the United States, residing at Happy Camp, in the county of Siskiyou and State of California, have invented certain new and useful Improvements in Sanitary Steam-Cookers, of which the following is a specification.

The present invention relates to certain new and useful Improvements in domestic cooking utensils, and has for its object to provide a cooking pot which can be used for steam cooking, basting, roasting and the like, and which embodies novel features of construction whereby the food will be thoroughly and evenly cooked and the essence or flavor all retained.

Further objects of the invention are to provide a cooking utensil of this character which is comparatively simple and inexpensive in its construction, which is tightly sealed when in use, which causes the drippings of condensed steam to drop evenly over the entire area of the kettle, which is safe and easy to use, and which can be easily and thoroughly cleaned.

With these and other objects in view, the invention consists in certain novel combinations and arrangements of the parts as will more fully appear as the description proceeds, the novel features thereof being pointed out in the appended claim.

For a full understanding of the invention, reference is to be had to the following description and accompanying drawing, in which:—

Figure 1 is a side elevation of a steam cooker constructed in accordance with the invention.

Fig. 2 is a vertical sectional view through the same.

Fig 3 is an enlarged detail sectional view of the cover of the cooker.

Fig. 4 is a perspective view of the cover.

Corresponding and like parts are referred to in the following description and indicated in all the views of the drawings by the same reference characters.

Specifically describing the present embodiment of the invention, the numeral 1 designates the body portion of the pot or kettle which is substantially cylindrical in shape and is preferably formed of some suitable cast metal such as iron or aluminum. The side walls of the pot extend downwardly below the bottom thereof as indicated at $1^a$ so as to hold the bottom slightly above the stove and prevent any food within the kettle from scorching or burning. It will also be observed that the bottom $1^b$ of the kettle is slightly concaved so that liquids within the kettle will run together at the center thereof.

Applied to opposite sides of the pot 1 are looped and outwardly projecting handles 2, the upper ends of the handles being formed of integral hook members 3 which project upwardly above the top of the pot and overhang the edges thereof. These handles 2 may be riveted or otherwise securely fastened to the sides of the kettle and provide a convenient means for emptying the same as well as for locking the cover in position thereon.

The cover 4 is adapted to fit over the top of the pot 1, and is formed at diametrically opposite points upon its periphery with upstanding wings 5 having oppositely inclined upper edges. When these wings 5 are rotated under the hook members 3 of the handles 2, the inclined edges of the wings have a cam action which serves to clamp the top upon the pot 1 and provide a substantially air-tight closure. In order to remove the cover 4 it is necessary to first rotate it in a reverse direction so as to disengage the cam wings or lugs 5 from the hook members 3.

The cover 4 has a concave lower face and is provided at the center thereof with an outlet opening 6 which has beveled edges and is normally closed by a safety valve 7. The safety valve rests upon its seat and is held in position thereon by the action of gravity, and a stem 8 which projects upwardly from the valve passes loosely through an opening in a handle 9 projecting upwardly from the cover. The valve 7 is normally closed, although should the steam pressure within the pot reach a dangerous point, the safety valve 7 will be lifted from its seat so as to permit of the escape of a portion of the steam. As soon as the pressure has thus been sufficiently reduced the valve will again drop back upon its seat, the movements of the valve stem through the opening in the handle 9 serving to direct the valve in its rise and fall and the handle 9 itself forming a stop to limit the opening movement of the valve, and prevent loss or complete displacement thereof.

Another important feature resides in the peculiar construction of the lower face of the cover 4 which causes an even drip of the condensed steam over the entire area of the pot. As previously stated, the lower face of the cover 4 is concaved so that the walls thereof are slightly inclined upwardly from the periphery of the cover to the center thereof. A series of concentric annular ribs 10 project vertically downward from the cover, each of the ribs being arranged in a horizontal plane. Corresponding annular grooves or pockets 11 are formed between the ribs 10, and the edges of the ribs are preferably comparatively sharp so that the condensed steam will drop freely therefrom. With this construction it will be obvious that moisture accumulating upon the lower face of the cover owing to the condensation of steam thereon will drip upon the food in a uniform manner instead of running down the sides of the cover and pot in a stream. The bases of the grooves 11 are rounded and the sides of the grooves toward the center of the cover are sharply inclined while the sides of the grooves toward the periphery of the cover are gradually inclined, thereby providing a construction which will deflect the moving steam or vapor outwardly into contact with the drippings hanging from the sharp edges 10 in such a manner as to dislodge the same. This causes the drippings of condensed steam to be quickly dislodged from the sharp edges 10, with the result that a very uniform dripping is obtained over substantially the entire area of the pot. This will result in a thorough and even cooking of the food within the pot, and owing to the fact that the cover has a practically air-tight joint with the pot, the flavors and essences will be retained in the food while cooking.

The cover 4 is provided at a point adjacent the edge thereof with a downwardly projecting peripheral flange 12 adapted to fit within the mouth of the pot 1 to hold the cover accurately in position thereon. This flange prevents the escape of steam and liquids from the vessel, and at the same time keeps the inside walls of the vessel moist, since condensed steam will run downwardly from the flange along the walls of the vessel. This flange 12 not only tends to provide a tight joint between the pot 1 and the cover 4, but also admits of the cover being readily applied to the top of the pot and properly positioned thereon preparatory to rotating the cover to bring the cam edges of the wings 5 into operative engagement with the hook members 3. The pot or vessel 1 may be made of any desired shape, depending upon the individual fancies of the manufacturer, and the use of the cooking vessel will bring about a tremendous saving of fuel, since the heat of the condensed steam will be utilized to the fullest possible extent.

Having thus described the invention, what I claim as new and desire to secure by Letters Patent, is:—

As a new article of manufacture, the herein described cooking pot cover which is circular in shape and has a concaved lower face and a smooth convex upper face, said concaved face being provided with a series of uniformly spaced concentric annular ribs which terminate in sharp vertically disposed and downwardly projecting edges, annular depressions with rounded bases being provided between the ribs and the walls of the depressions merging into the walls of the ribs, so that steam condensing within the depressions will run downwardly to the edges of the ribs and be dislodged by the steam deflected by the rounded bases of the depressions so as to drip evenly over the entire area under the cover.

In testimony whereof I affix my signature in the presence of two witnesses.

FELIX A. G. BUSSE.

Witnesses:
 S. S. FARRIS,
 E. B. DOOLITTLE.